7816X
B. Lapham,
Force Pump,
Patented Nov. 19, 1833.
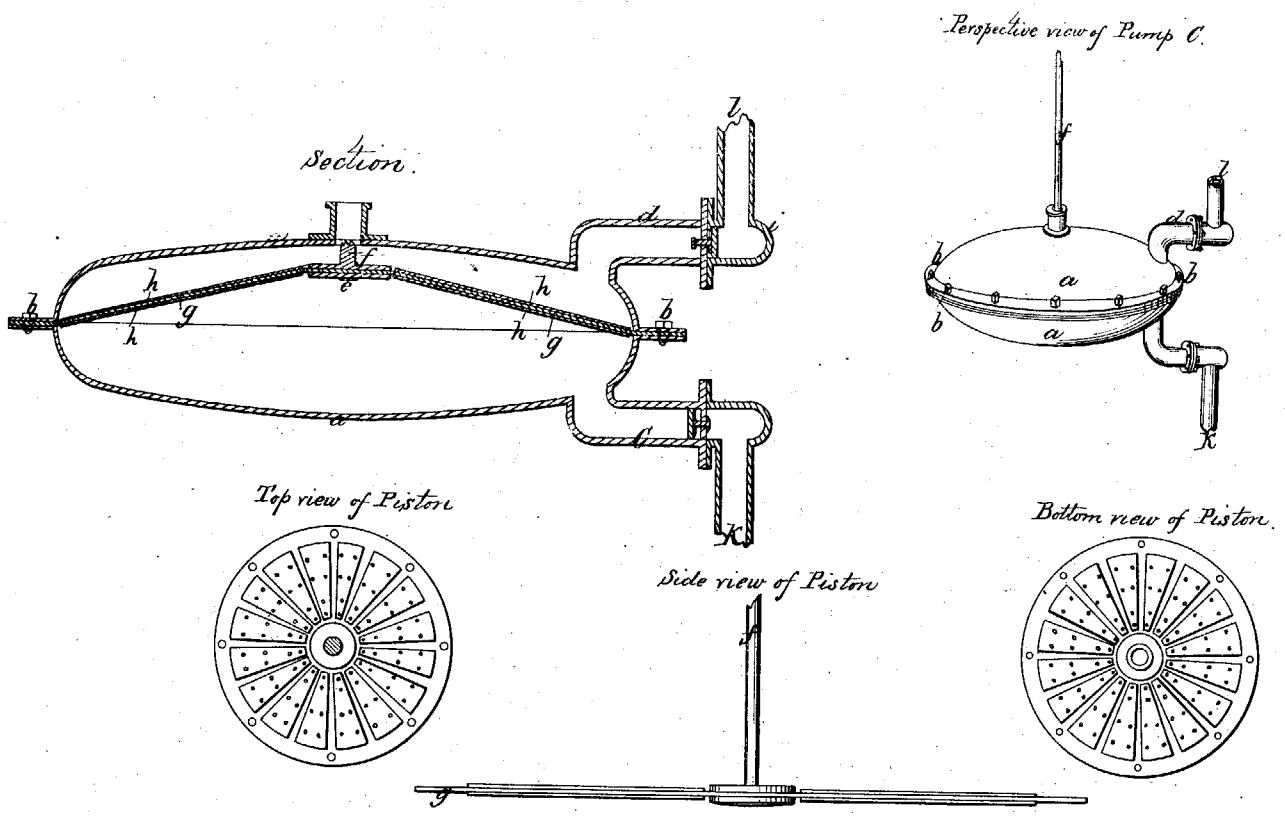

Benjamin Lapham of Waterford New York.

Letters Patent

The Schedule referred to in these Letters Patent and making part of the same containing a description in the words of the said Benjamin Lapham himself of his improvement in the forcing pump To all persons to whom these presents shall come - Benjamin Lapham of Waterford in the County of Saratoga and State of New York sends Greeting - Know Ye that I the said Benjamin Lapham have invented construct made and put to use a new and useful improvement - to wit, an improved forcing pump calculated to lessen, or nearly dispence with the friction occasioned by the pistons in the common pumps now in use; and also to prevent entirely or very nearly the loss of water escaping between the piston and the sides of the pump. which improved pump by varying its size and some other slight variations applies with equal fitness to all the purposes of raising water from the common house pump for domestic use, to the fire engine or forcing pump for extinguishing fire. The chief component parts of this pump like all other pumps, are the body or chamber which receives and discharges the water, and the piston.

The body or chamber of this Pump may be of block tin, of Pewter, or of cast iron or any other suitable metal or mixture of metals, and is cast or formed in two halves, each half being nearly in the form of the common basin; Each half has a flange round the edge, through which the two halves are secured together by screw bolts, so that when the two are screwed together, the whole is somewhat in form of a watch. But two opposite edges of this chamber have each a cylindrical projection, each projection extending in length a little beyond the edge of the flanges. and on the end of each projection is a circular flange. One half of each projection and flange being attached 3[illegible] 78164 to, and making part of the half of the chamber to which is respectfully
belongs — The Piston consists of a circular piece of strong and substan
tial leather inserted between the two flanges which extending throughout
divides the said body or chamber into two equal halves. To the cen
tre of this piece of leather is attached by proper flanges, nut & screw
the end of the piston rod, which piston rod passes from said leather
at right angles, and through the sides of the chamber, which has a
projection in the centre in which it is made tight with proper
stuffing so that the said piston rod can act and react without
suffering the water to escape; Said piston or circular piece of leather
is supported on each side by ~~two~~ tri angular pieces, of sheet iron, brass
or any other suitable metal, which pieces are so placed and of such
size and such angles, that while the base of each piece rests against
a shoulder on the inside of its respective basin, each of the other
two sides describes a radius from the insertion of the piston in the
centre to the said shoulder or base; and each should, making a chord
of about sixty degrees, or any other aliquot number, into which the circle
of the inside of the basin can be divided; the said plates of metal
cover the leather on each side, except that the joints are so far
open as to suffer the leather to bend a sufficient distance between
the plates. the joints on the opposite sides being exactly opposite
each other. Thus a double chamber is formed by the piston one
half being on each side of it. A kind of dome with a flange
round its base is fastened by screws through the flanges to the ends
of the above mentioned cylindrical projections, and each dome ter
minates in a cylindrical neck to which the receiving and discharging
tubes of the pump are coupled by connecting screws. In each of these
domes are two valves, one on each side of the piston or division of
the two chambers, those on the receiving side opening inward, and those
on the discharging side opening outward. When the piston or partition of
leather above described is moved alternately towards each side by the
piston rod. The respective chambers are thereby alternately enlarged and

7816X contracted, and by means of the valves, each chamber fills from below as
it expands and discharges above, as it contracts. As the attitudes or
positions in which this pump may be placed, and the modes in which
the lever or handle may be applied, are so various, it is unnecessary to
specify any one in particular. The plates of metal are secured on each
side of the leather, by rivets passing through both plates and through the
leather. When the above is constructed on a large scale for extinguish
ing fire, the chambers will be best made of cast iron or of sheet copper,
but to whatever purpose applied, I hereby claim the double chamber and
leather partition piston, supported by plates of metal as above speci
fied, as essential parts of this my said invention. In witness that
the above is a true specification, I have hereunto set my hand
and seal in Waterford aforesaid on the seventeenth day of June
in the year one thousand eight hundred and thirty three.

Witness
Henry Cuson
Sam.l B. Blydenburgh

Benjamin Lapham.

(924 words)

(Patented 19 November 1833)